United States Patent
Cho

(10) Patent No.: US 9,798,934 B2
(45) Date of Patent: Oct. 24, 2017

(54) METHOD AND APPARATUS FOR PROVIDING COMBINED-SUMMARY IN IMAGING APPARATUS

(71) Applicant: Hanwha Techwin Co., Ltd., Gyeongsangnam-do (KR)

(72) Inventor: Sungbong Cho, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/363,609

(22) Filed: Nov. 29, 2016

(65) Prior Publication Data

US 2017/0076155 A1 Mar. 16, 2017

Related U.S. Application Data

(63) Continuation of application No. 14/710,824, filed on May 13, 2015, now Pat. No. 9,542,604.

(30) Foreign Application Priority Data

Oct. 14, 2014 (KR) ........................ 10-2014-0138611

(51) Int. Cl.
*G06K 9/00* (2006.01)
*H04N 9/806* (2006.01)
(Continued)

(52) U.S. Cl.
CPC ........ *G06K 9/00751* (2013.01); *G11B 27/031* (2013.01); *G11B 27/32* (2013.01);
(Continued)

(58) Field of Classification Search
CPC ......... G06F 17/30746; G06F 17/30796; G04F 17/30843; H04N 21/8549
See application file for complete search history.

(56) References Cited

U.S. PATENT DOCUMENTS 6,172,675 B1    1/2001  Ahmad et al.
6,310,839 B1 *  10/2001 Lee ................... G06F 17/30787
                                                        369/30.07
(Continued)

FOREIGN PATENT DOCUMENTS

KR    2002-0000563 A    1/2002
KR    10-0850791 B1    8/2008
KR    10-2014-0060659 A    5/2014

*Primary Examiner* — Huy T Nguyen
(74) *Attorney, Agent, or Firm* — Sughrue Mion, PLLC

(57) ABSTRACT

A method and apparatus of providing a combined summary by receiving monitored audio and video are provided The method includes: receiving audio and video captured by at least one network camera; generating a video summary by detecting at least one video event from at least one of the audio and the video; generating an audio summary by detecting at least one audio event from at least one of the audio and the video; extracting at least one section of the video summary corresponding to the at least one audio event, and storing the extracted at least one section of the video summary with the audio summary; and providing a display of the video reproducing apparatus with a video summary control interface for controlling the video summary and an audio summary control interface for controlling the audio summary.

22 Claims, 7 Drawing Sheets

(51) Int. Cl.
| | |
|---|---|
| *H04N 7/18* | (2006.01) |
| *G11B 27/031* | (2006.01) |
| *G11B 27/32* | (2006.01) |
| *H04N 5/91* | (2006.01) |
| *H04N 9/804* | (2006.01) |
| *H04N 9/82* | (2006.01) |
| *H04N 21/8549* | (2011.01) |
| *H04N 21/439* | (2011.01) |
| *H04N 21/44* | (2011.01) |
| *H04N 21/84* | (2011.01) |
| *H04N 21/434* | (2011.01) |

(52) U.S. Cl.
CPC ............... *H04N 5/91* (2013.01); *H04N 7/181* (2013.01); *H04N 7/183* (2013.01); *H04N 9/806* (2013.01); *H04N 9/8042* (2013.01); *H04N 9/8205* (2013.01); *H04N 21/434* (2013.01); *H04N 21/4394* (2013.01); *H04N 21/44008* (2013.01); *H04N 21/84* (2013.01); *H04N 21/8549* (2013.01)

(56) References Cited

U.S. PATENT DOCUMENTS

| | | | |
|---|---|---|---|
| 6,332,120 B1 | 12/2001 | Warren | |
| 6,973,256 B1 * | 12/2005 | Dagtas | G06F 17/30787 |
| | | | 386/241 |
| 2007/0171303 A1 | 7/2007 | Barbieri et al. | |

* cited by examiner

METHOD AND APPARATUS FOR PROVIDING COMBINED-SUMMARY IN IMAGING APPARATUS

CROSS-REFERENCE TO THE RELATED APPLICATION

This is a continuation of U.S. application Ser. No. 14/710,824 filed May 13, 2015, which claims priority from Korean Patent Application No. 10-2014-0138611, filed on Oct. 14, 2014, in the Korean Intellectual Property Office, the disclosure of which is incorporated herein in its entirety by reference.

BACKGROUND

1. Field

Apparatuses and methods consistent with exemplary embodiments relate to video monitoring, and more particularly, to generating and providing a video summary or a video synopsis based on audio data in a video monitoring system.

2. Description of the Related Art

In a video monitoring system, video data of an input video is summarized using a video data-based video summary/video synopsis function.

If only video data is summarized in the video monitoring system, an event occurring at a blind spot of a surveillance camera or an important audio event occurring without a video event may be missed.

If only audio data is summarized in the video monitoring system, the content of the audio data is difficult to grasp when the audio data is not heard in chronological order, unlike video data. When various audio data are reproduced at the same time, the contents of the audio data are unlikely to be recognized.

SUMMARY

Exemplary embodiments provide a video reproducing apparatus and a method of providing a combined summary at the video reproducing apparatus.

Various aspects will be set forth in part in the description which follows and, in part, will be apparent from the description, or may be learned by practice of the presented embodiments.

According to an exemplary embodiment, there is provided a method of providing a combined summary in a video reproducing apparatus. The method may include: receiving audio and video captured by at least one network camera; generating a video summary by detecting at least one video event from at least one of the audio and the video; generating an audio summary by detecting at least one audio event from at least one of the audio and the video; extracting at least one section of the video summary corresponding to the at least one audio event, and storing the extracted at least one section of the video summary with the audio summary; and providing a display of the video reproducing apparatus with a video summary control interface for controlling the video summary and an audio summary control interface for controlling the audio summary.

The above method may further include: selecting a section of the video summary, in which a specific video event is detected, using the video summary control interface; selecting a section of the audio summary, in which a specific audio event is detected, using the audio summary control interface; and if the selected section of the video summary and the selected section of the audio summary overlap with each other, identifying the overlapping sections to be distinguished from the other sections of the video summary and the audio summary, in the display of the video reproducing apparatus.

Alternatively, the above method may further include: selecting a section of the audio summary, in which a specific audio event is detected, using the audio summary control interface; selecting a section of the video summary, in which a specific video event is detected, using the video summary control interface; and if the selected section of the audio summary and the selected section of the video summary overlap with each other, identifying the overlapping sections to be distinguished from the other sections, in the display of the video reproducing apparatus.

The at least one audio event may be detected from the at least one of the audio and the video by determining that the at least one audio event has occurred if an identifiable feature is detected from the at least one of the audio and the video. The identifiable feature may include at least one of a specific word, a specific character, and specific sound.

The above method may further include: converting the identifiable feature into a text; and displaying the text in the audio summary with time information about when the identifiable feature is detected.

According to another exemplary embodiment, there is provided a method of receiving audio and video from a terminal and providing a combined summary. The method may include: extracting an audio frame including an identifiable feature from the audio and the video; extracting either a video frame corresponding to the audio frame or a video summary of the video frame; linking the audio frame to the video frame or the video summary of the video frame; and inserting a time tag representing a time of the video to which the audio frame belongs.

According to still another exemplary embodiment, there is provided a video reproducing apparatus for providing a combined summary which may include: a receiver configured to receive audio and video captured by at least one network camera; a video summary generator configured to generate a video summary by detecting at least one video event from at least one of the audio and video; an audio summary generator configured to generate an audio summary by detecting at least one event from at least one of the audio and the video; an audio summary storage configured to extract at least one section of the video summary corresponding to the at least one audio event, and store the extracted at least one section of the video summary with the audio summary; and a video summary control interface provided for controlling the video summary on a display of the video reproducing apparatus; and an audio summary control interface provided for controlling the audio summary on the display of the video reproducing apparatus.

BRIEF DESCRIPTION OF THE DORIGINALINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Figure 1:
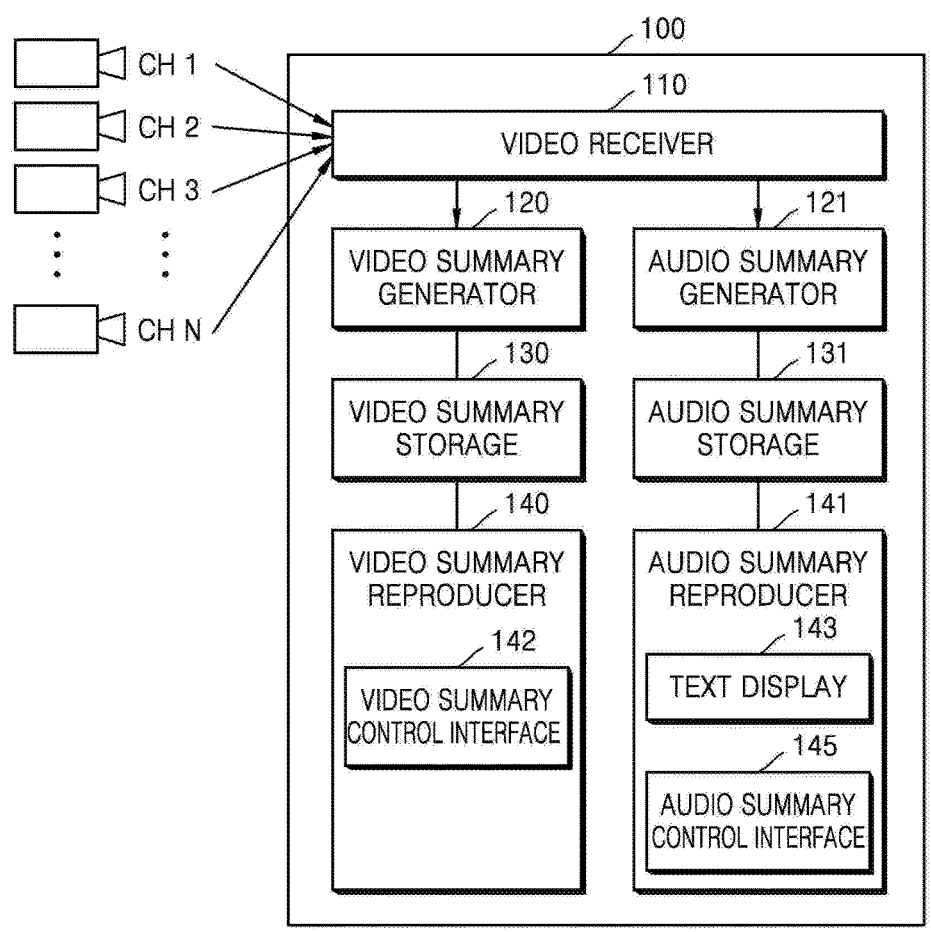
FIG. 1 is a block diagram of a video reproducing apparatus capable of providing a combined summary, according to an exemplary embodiment.

Reference will now be made in detail to exemplary embodiments which are described herein with reference to the accompanying drawings. In this regard, the embodiments may have different forms and should not be construed as being limited to the descriptions set forth herein. Accordingly, the embodiments are merely described below, by referring to the drawings, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Figure 3:
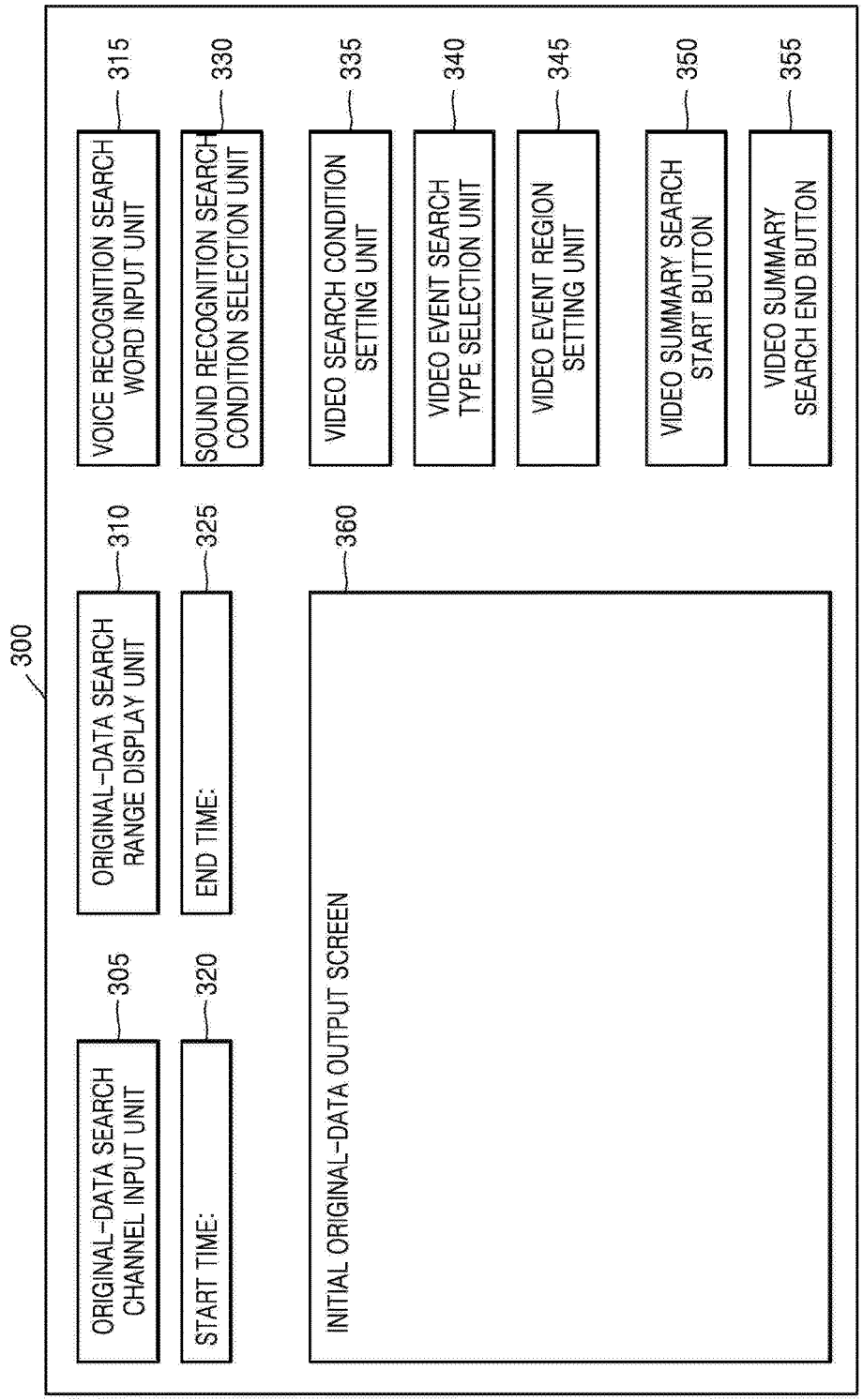
FIG. 3 illustrates a combined-summary search screen, according to an exemplary embodiment.
Figure 7:
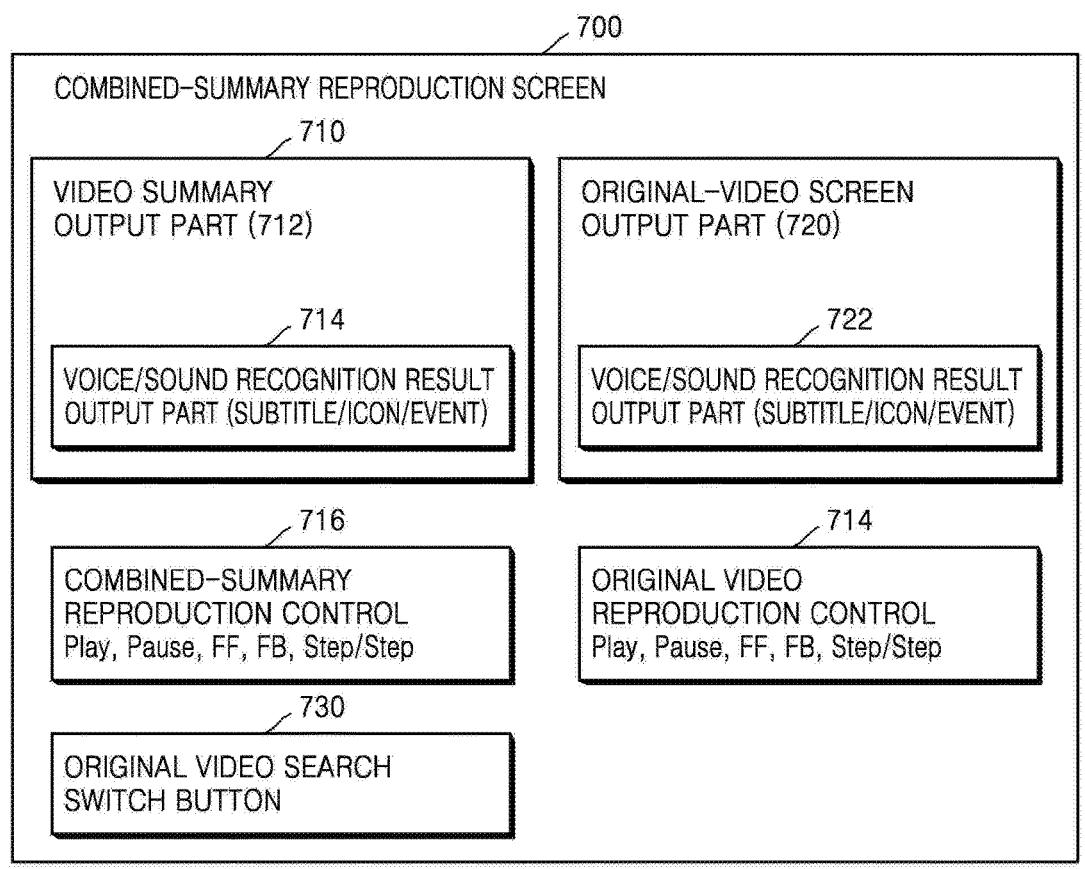
FIG. 7 illustrates a combined-summary reproduction screen, according to an exemplary embodiment.

FIG. 1 is a block diagram of a video reproducing apparatus capable of providing a combined summary, according to an exemplary embodiment. FIG. 3 illustrates a combined-summary search screen including a video summary control interface and an audio summary control interface supported in the video reproducing apparatus, according to an exemplary embodiment. FIG. 7 illustrates a combined-summary reproduction screen to explain a method of reproducing the combined summary, according to an exemplary embodiment. Various exemplary embodiments will be described with reference to FIGS. 1, 3 and 7 below.

According to an exemplary embodiment, the combined summary may be understood as selectively reproducing a video summary or an audio summary or simultaneously reproducing the video summary and the audio summary according to a user's selection.

The combined summary may be reproduced by selecting an audio summary including specific sound and a specific word from audio, setting a time range of video to be compressed by combining video summaries including a specific event, and extracting audio and a video frame.

According to an exemplary embodiment, even if an audio summary is reproduced solely, a video frame or a video summary of a section corresponding to the audio summary is reproduced together with the audio summary.

According to an exemplary embodiment in reference to FIG. 1, a video reproducing apparatus 100 includes a video receiver 110, a video summary generator 120, a video summary storage 130, a video summary reproducer 140 which includes a video summary control interface 142, an audio summary generator 121, an audio summary storage 131, and an audio summary reproducer 141 which includes a text display 143 and an audio summary control interface 145.

The video receiver 110 receives audio/video from at least one camera such as a network camera. The video summary generator 120 generates a video summary by processing video data of the audio/video received by the video receiver 110, and stores the video summary in the video summary storage 130

The video summary generator 120 generates the video summary by detecting an event from the audio/video, i.e., an original audio/video. In this case, the event may be defined as a scene including an identifiable feature. For example, the event may include both an object (such as a building, an automobile, a person, an animal, etc.) and a scene (such as a fire, an explosion, an accident, etc.).

The video summary storage 130 stores either a motion detected when the video summary generator 120 generates the video summary or a result of analyzing video of a detected event, together with the video summary.

The audio summary generator 121 generates an audio summary by processing audio data of audio/video received by the video receiver 110, and stores the audio summary in the audio summary storage 130. The audio summary storage 130 extracts a video frame or a video summary corresponding to each section of the audio data in which an event is detected, or extracts the video summary and stores the video summary together with the audio summary.

According to an exemplary embodiment, the audio summary generator 121 may perform time-based audio/video compression, specific word-based audio/video compression, sound-based audio/video compression, or complex audio/video compression which is a combination of these compressions.

In time-based audio/video compression, sampling is performed in a range of a specified time period in which audio data is included, and a video frame in the specified time period is extracted.

In this case, specified time periods in which a specific word, a specific sentence, or specific sound is included are sampled. Even if an event is detected in video data in a time period in which audio data is not present, a video frame including the event is sampled. When an event does not occur in most time periods, a video frame corresponding to an arbitrary time period is selected to generate compressed audio and video.

In specific word-based audio/video compression, a video frame is extracted in a specified time period in which a specific word or sentence is included. In this case, whether the specific word is included or not may be determined based on data converted into a text. When the voice data includes only a word, a context of the voice data may not be able to be understood. Thus, video is extracted in not only a time range including the word but also in a time period prior to and a time period following the time range.

In sound-based audio/video compression, a time range is obtained according to data obtained by extracting a pattern of specific sound from audio data, and a video frame is extracted in this time range in such a manner that specific word-based audio/video compression is performed.

In FIG. 3, the video summary control interface 142 and the audio summary control interface 145 of the video reproducing apparatus 100 (FIG. 1) are illustrated as a combined-summary search screen 300.

Referring to FIG. 3, the combined-summary search screen 300 includes an original-data search channel input unit 305, an original-data search range display unit 310, a voice recognition search word input unit 315, an original-data start time input unit 320, an original-data end time input unit 325, a sound recognition search condition selection unit 330, a video search condition setting unit 335, a video event search type selection unit 340, a video event region setting unit 345, a video summary search start button 350, a video summary search end button 355, and an initial original-data output screen 360.

The original-data search channel input unit 305 is a region through which a user such as a surveillance system manager inputs a channel of original data of which a video summary is to be generated. Here, the original data may be original audio/video data received at the video receiver 110 of the video reproducing apparatus. The original-data search range display unit 310 is a region through which the user displays a range of the original data of which the video summary is to be generated. When a channel of a camera by which the original data is obtained is determined using the original data search channel input unit 305, an amount of the original data is represented in a unit of time in the original-data search range display unit 310.

The amount of the original data displayed on the original-data search range display unit 310 helps the user input an appropriate time into the original-data start time input unit 320 and the original-data end time input unit 325.

The voice recognition search word input unit 315 is a region through which the user may input a word or a sentence to be searched for from audio data of the original data.

The original-data start time input unit 320 and the original-data end time input unit 325 are regions through which the user may input time information, such as a start time point and an end time point of the original data, which is needed to extract a video summary of the original data.

The sound recognition search condition selection unit 330 is a region through which the user may select a type of sound to be searched for from the audio data of the original data. Examples of sound that the user may select may be gunfire, sound of shattering a glass window, a scream, etc. The user may arbitrarily add or delete a type of sound.

The video search condition setting unit 335 is a region through which a video search condition may be set to sample a video frame in a unit of time or in a unit of a specific event.

The video event search type selection unit 340 is a screen activated when the video search condition is set to sample a video frame in a unit of a specific event by using the video search condition setting unit 335. Through the video event search type selection unit 340, the user may select a type of a video event to be extracted from the original data.

The video event region setting unit 345 is a screen activated when the video search condition is set to sample a video frame in a unit of a specific event by using the video search condition setting unit 335. Through the video event region setting unit 345, the user may set a region of a video event to be extracted from the original data. The user may use the video event region setting unit 345 to search for a partial segment of source video in which events are captured, and thus, a video frame including the video event may be more efficiently extracted.

According to an exemplary embodiment, the audio summary control interface 145 (FIG. 1) may include the voice recognition search word input unit 315, the sound recognition search condition selection unit 330, and other various interfaces for controlling, storing, and reproducing an audio summary.

According to an exemplary embodiment, the video summary control interface 142 may include the video search condition setting unit 335, the video event search type selection unit 340, the video event region setting unit 345, and other various interfaces for controlling, storing, and reproducing a video summary.

FIG. 7 illustrates a combined-summary reproduction screen, according to an exemplary embodiment.

Referring to FIG. 7, when a user simultaneously reproduces a video summary and an audio summary, the video summary or the audio summary is reproduced according to a preset condition such as chronological order or an order in which events occurred. Such a criterion may be set using a combined-summary reproduction control interface 716. The combined-summary reproduction control interface 716 is a concept including both the audio summary control interface 145 and the video summary control interface 142 illustrated in FIG. 1.

In a combined-summary reproduction screen 700, an identification mark is assigned to a time period in which a video summary and an audio summary overlap with each other so that the user may recognize a video event and an audio event overlap in the time period.

According to another exemplary embodiment, only a section of an audio summary in which a specific event occurs may be selected using an audio summary control interface, e.g., the combined-summary reproduction control interface 716, and only a section of an audio summary in which a specific event occurs may be additionally selectively selected using a video summary control interface, e.g., the combined-summary reproduction control interface 716. In this case, when a section of the audio summary in which the specific event occurs and a section of the video summary in which the specific event occurs overlap with each other, the audio summary and the video summary may be also reproduced in such a manner that the overlapping sections are identified (see reference numerals 710, 712, and 714).

Figure 2:
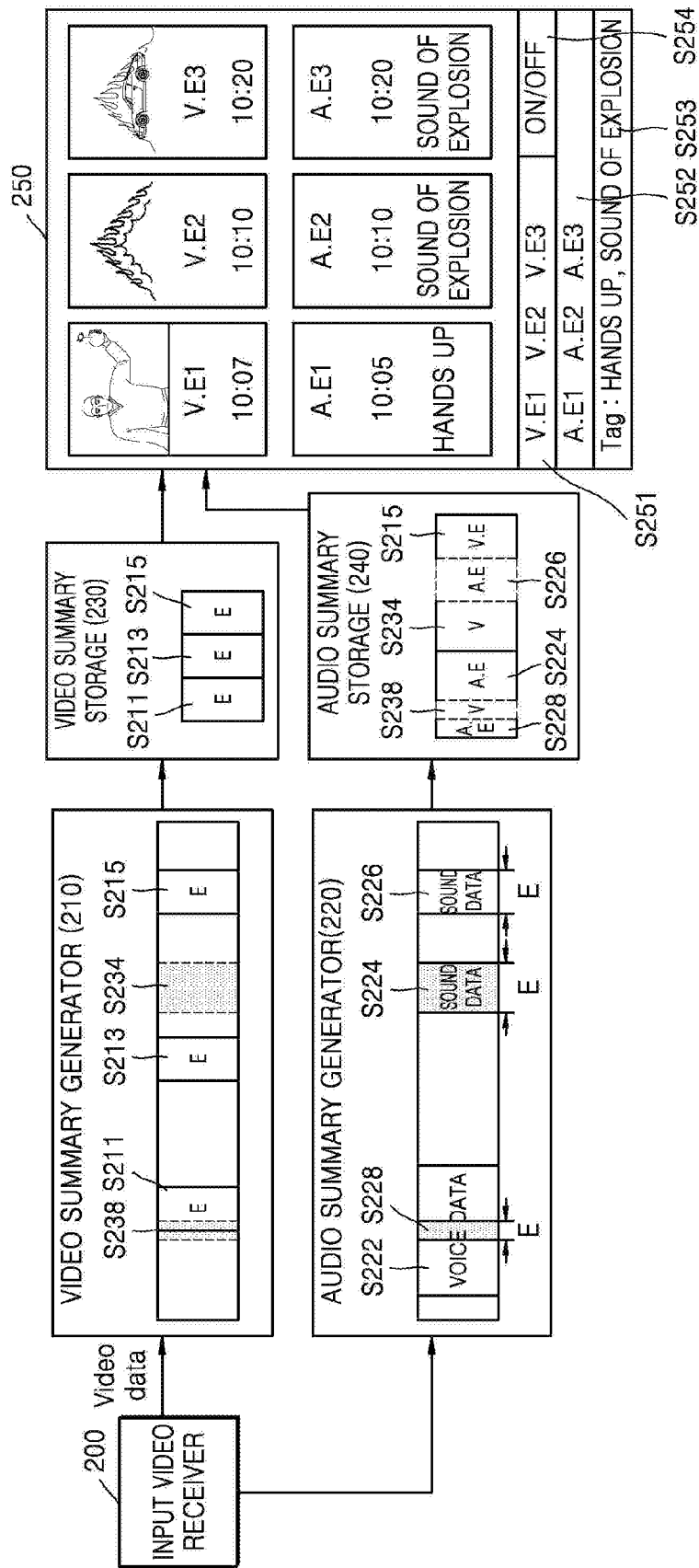
FIG. 2 illustrates some functions of components of a video reproducing apparatus capable of providing a combined summary, according to an exemplary embodiment.

FIG. 2 illustrates some functions of components of a video reproducing apparatus capable of providing a combined summary, according to an exemplary embodiment.

A video summary generator 210 generates a video summary by processing video data received from an input video receiver 200, and stores it in a video summary storage 230. The video summary generator 210 detects events having an identifiable feature from the video data (see S211, S213, and S215), and stores information regarding sections of the video data in which the events are detected in the video summary storage 230. Referring to FIG. 2, a man who carried a bomb with himself and was detected at 10:07, a bomb explosion occurring at 10:10, and a vehicle bomb explosion occurring at 10:20 are illustrated as examples of a video event.

An audio summary generator 220 generates an audio summary by processing audio data received from the input video receiver 200, and stores it in an audio summary storage 240. The audio summary generator 220 detects events having an identifiable feature from the audio data (see S228, S224, and S215), and stores sections in which the events are detected in the audio summary storage 240.

The audio summary generator 220 detects events having an identifiable feature (see S228, S224, and S215) from sections S222, S224, and S226 of the audio data that contain significant data. Also, video frame sections S238, S234, and S215 corresponding to the sections S222, S224, and S226 are stored together with the sections S222, S224, and S226.

Referring to FIG. 2, voice data "hands up" detected at 10:05, sound of explosion detected at 10:10, and sound of explosion detected at 10:20 are detected as examples of an audio event. According to an exemplary embodiment, an audio event is stored together with a video frame or a video summary corresponding to a point of time when the audio event was detected.

Although not shown in FIG. 2, the voice data "hands up" detected at 10:05 is stored together with a video frame corresponding to 10:05. In the audio summary storage 240, data is stored in an audio/video interleaved file format in which an audio frame and a video frame are mixed together. In this case, a time tag representing a time of original video corresponding to each of the video frame and the audio frame may be inserted into each of the video frame and the audio frame.

When an audio summary including the voice data "hands up" detected at 10:05 is reproduced, the video frame or a video summary corresponding to the point of time 10:05 is reproduced together with the audio summary.

According to an exemplary embodiment, since an audio summary and a video summary includes time information of the original data of a video/audio frame from which an event is detected, it is possible to move to and reproduce the original data when needed (see 714, 720, 722, and 730 of FIG. 7)

An integrated reproduction unit 250 configured to reproduce an audio summary or a video summary may display a tag S251 or S252 representing an audio event or a video event. Also, the integrated reproduction unit 250 may display a text converted from an audio event in the form of tag S253.

Figure 4:
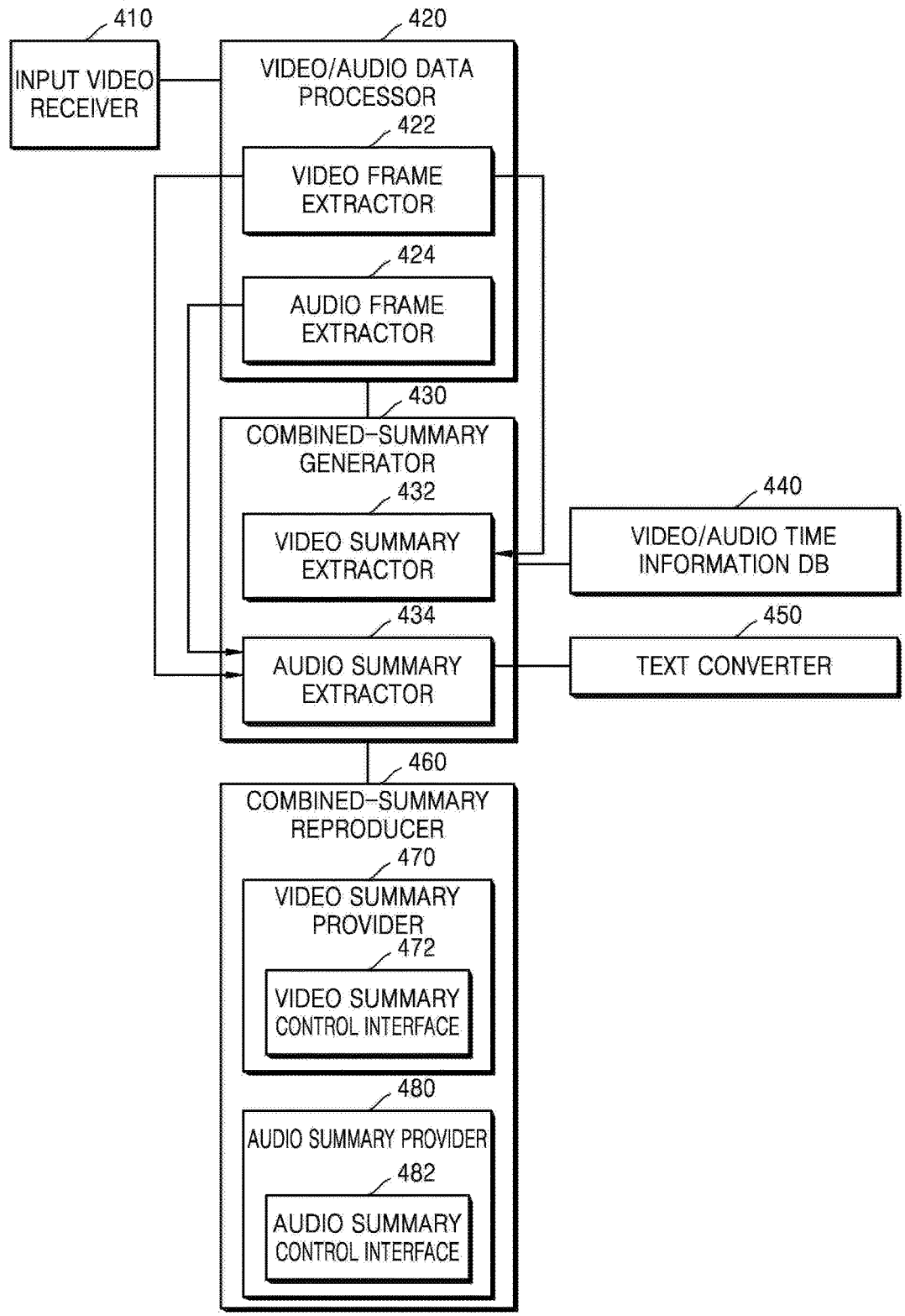
FIG. 4 is a block diagram of a video reproducing apparatus, according to another exemplary embodiment.

FIG. 4 is a block diagram of a video reproducing apparatus according to another exemplary embodiment.

The video reproducing apparatus includes an input video receiver 410, a video/audio data processor 420, a combined-summary generator 430, a combined-summary reproducer 460, a video/audio time section information database (DB) 440, and a text converter 450.

The video/audio data processor 420 includes a video frame extractor 422 and an audio frame extractor 424. The combined-summary generator 430 includes a video summary extractor 432 and an audio summary extractor 434.

The video frame extractor 422 may extract identifiable features from received video data in a unit of time or in a unit of event. In this case, various techniques such as line detection, field detection, merging, isolation, and face detection may be used.

The combined-summary generator 430 may combine an audio event section extracted by the audio summary extractor 434 with a video event section corresponding to the audio event section to form a link, based on the video/audio time section information DB 440. The text converter 450 converts voice data, which is extracted by the audio summary extractor 434, into a text and outputs the voice data in the form of text.

The combined-summary reproducer 460 includes a video summary provider 470 and an audio summary provider 480 which respectively includes a video summary control interface 472 and an audio summary control interface 482.

Figure 5:
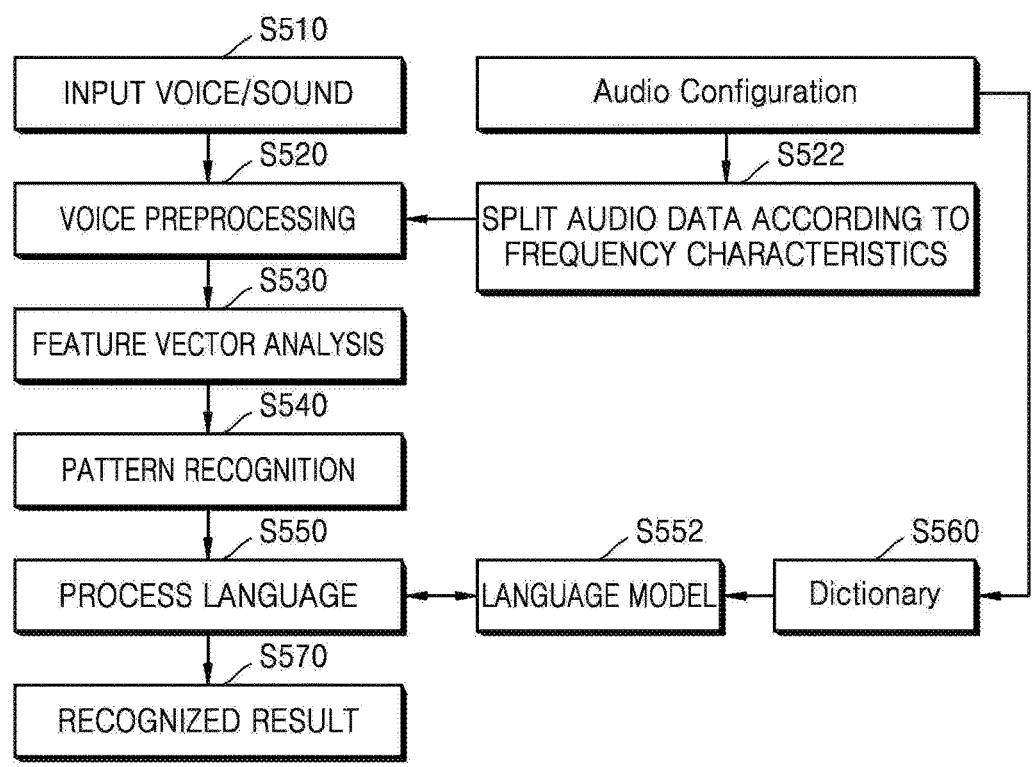
FIG. 5 is a flowchart of a process of processing an audio signal by using an audio frame extraction unit, according to an exemplary embodiment.

FIG. 5 illustrates a flowchart of a process of processing an audio signal by using the audio frame extractor of FIG. 4, according to an exemplary embodiment.

When receiving audio data (operation S510), the audio frame extractor 424 splits the audio data into one or more sections based on frequency characteristics of the audio data (operation S522). The audio data may be split according to the frequency characteristics, e.g., according to a high frequency, an intermediate frequency, and a low frequency. Otherwise, the audio data may be split according to an adult man's voice, an adult woman's voice, and a child's voice. In this case, various information regarding characteristics of audio provided from an audio configuration unit (not shown) may be referred to.

After voice preprocessing is performed (operation S520), a feature point of audio data split according to a frequency is extracted to be represented in the form of feature vector, and processed as data in which a tone or pattern of voice/sound can be analyzed (operation S530). In detail, operation S530 is performed prior to extracting a significant word, syllable, or sentence from the audio data, in which the audio data is processed using a feature vector and a filter for appropriately processing each data is determined.

For example, a pitch, pronunciation, and utterance speed of a voice of a woman may be primarily analyzed using a feature vector of voice data of the woman that is split according to a frequency, additional information such as the age of the woman may be secondarily analyzed, and a filter to be applied to the voice data and a method of processing the voice data may be then determined. Sound data may be analyzed similar to the voice data.

After the feature vector is analyzed (operation S530), a pattern of the analyzed feature vector is recognized and compared with a predetermined reference pattern (operation S540). The reference pattern includes information regarding sound, such as age, sex, and utterance speed of a person who utters voice, the pitch of voice, gunfire, a scream, alarm sound, sound of scattering a glass window, etc.

Also, a pattern of voice may be recognized by individually recognizing words, for example, through isolated-word recognition, recognizing sentences through continuous voice recognition, or detecting a keyword.

The audio frame extractor extracts an audio frame including an audio pattern that is the same as a preset reference pattern among the patterns of analyzed feature vectors, and time section information of the audio frame. Here, the time section information of the audio frame means information representing a time section when a portion of original data corresponding to the audio frame is reproduced.

According to an exemplary embodiment, a series of audio frames may be extracted from an audio data having a specified meaning.

Figure 6:
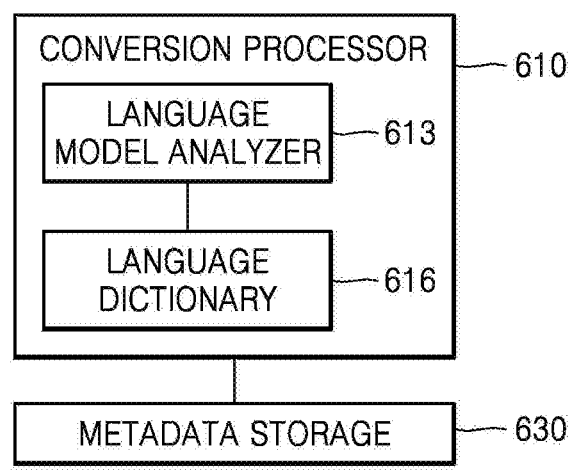
FIG. 6 is a block diagram of a text converter for converting an audio signal into a text, according to an exemplary embodiment.

Since a context may not be understood only based on a specific word, an audio frame may be extracted based on time section information obtained by increasing the range of a time period, which correspond to a specific word corresponding to an audio event, to include time periods prior to and following the time period so as to accomplish a goal of a surveillance system. The method of extracting an audio frame is also applicable to specific sound. A process of converting audio into a text will be described with reference to FIG. 6 below which illustrates a detailed configuration of the text converter 450 of FIG. 4. According to an exemplary embodiment, the text converter 450 includes a conversion processor 610 and a metadata storage 630. The conversion processor 610 includes a language model analyzer 613 and a language dictionary 616.

Returning to FIG. 5, after the above pattern recognition is completed (operation S540), an extracted audio frame is received and converted into a text (operation S550). The language model analyzer 613 receives voice data, primarily determines a type of a language included in the voice data, specifies the type of the language, and provides the voice data and information regarding the specified language to the language dictionary 616.

The language dictionary 616 receives the information regarding the specified language from the language model analyzer 613, and provides information for a conversion processor 610 to convert the voice data into a text.

A text converted from the voice data based on the information obtained from the pattern recognition performed in operation S540 may include not only a significant word or sentence but also information such as a sex of a person who uttered, a pitch of voice, an age of the person, etc. For example, when it is recognized from the voice included in the voice data that an Irish woman in her twenties is asking for a help, a subtitle "Help me, Irish woman in her twenties" is displayed on a monitor of a surveillance system.

A metadata storage 630 receives and stores the audio data converted into a text through the conversion processor 610. In this case, not only the audio data converted into the text is stored but also audio time information corresponding to sections into which the audio data is split according to frequency characteristics is stored as video metadata.

Video time section information corresponding to the audio data that is split according to frequency characteristics may be replaced with video time section information corresponding to the audio data converted into the text. Also, the audio time section information stored as video metadata may be converted and stored into a text.

For example, if a video section corresponding to the audio data that is split according to frequency characteristics corresponds to 12:00 to 12:20 and a video section (a section in which an audio event is detected) corresponding to the audio data converted into the text corresponds to 12:05 to 12:06, video time section information for a subtitle to be displayed on a screen of a surveillance system may correspond to 12:05 to 12:06.

However, since the video time section information corresponding to 12:00 to 12:20 is needed to determine an exact time when voice/sound data including an audio event was generated so as to grasp content of the audio data, the two video sections may be selectively used by a user.

As described above, according to the above exemplary embodiments, a video reproducing apparatus capable of providing a combined summary may summarize both audio data and video data so that data regarding a time period in which a video event did not occur may be also summarized, thereby improving the precision of the data.

In addition, the above embodiments can also be implemented through computer readable code/instructions in/on a medium, e.g., a computer readable medium, to control at least one processing element to implement the above described operations or functions of a video reproducing apparatus. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

At least one of the components, elements or units represented by a block as illustrated in FIGS. 1, 2, 4 and 6 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Two or more of these components, elements or units may be combined into one single component, element or unit which perform all operations or functions of the combined two or more components, elements of units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method for providing a video summary in a surveillance system, the method comprising:
obtaining video data and audio data captured by a surveillance camera;
generating a video summary from the video data, the video summary containing at least one of video events detected by at least one of identifiable video features and audio features;
controlling to search for a video event in the video summary that matches an audio event at least partially based on the audio features; and
controlling to display an indicator of the audio event with the video event on a display of the surveillance system while displaying the video event.

2. The method of claim 1, wherein the audio event is determined to be detected when a human voice is included in a portion of the audio data corresponding to the audio event.

3. The method of claim 2, wherein the generating the video summary comprises:
finding a specific time period in which the audio event occurs;
determining that the video event occurs in around the specific time period; and
adding the video event to the video summary.

4. The method of claim 2, wherein the audio features are identified by at least one of characteristics of the human voice.

5. The method of claim 4, wherein the characteristics of the human voice includes at least one of a sex, an age, a type of dialect and an estimated human race, and
wherein the generating the video summary comprises:
adding information on the characteristics of the human voice to the video summary as meta data for the video event.

6. The method of claim 5, wherein the searching for the video event comprises:
selecting the video event where a person who is identified as having at least one of the characteristics of the human voice is present.

7. The method of claim 2, wherein the generating the video summary comprises:
recognizing the human voice in the audio event;
converting the human voice into a text;
finding a specific time period in which the audio event occurs if a specified word is determined to be included;
determining that the video event occurs in around the specific time period; and
adding the text to the video summary as meta data for the video event.

8. The method of claim 7, wherein the searching for the video event comprises selecting the video event containing a specified word in the meta data.

9. The method of claim 8, wherein at least a part of the text is displayed as the indicator of the audio event with the video event.

10. The method of claim 1, wherein the audio event is determined to be detected when a pattern of specified sound is included in a portion of the audio data corresponding to the audio event.

11. The method of claim 10, wherein the pattern of specified sound represents one of gunfire, a scream, alarm sound, explosion and breaking sound, and
wherein the generating the video summary comprises:
adding information on the pattern to the video summary as meta data for the video event.

12. The method of claim 1, further comprising:
controlling to reproduce the combined summary.

13. The method of claim 1, further comprising:
adding time information corresponding to the audio event; and
controlling to reproduce video frames and audio frames, corresponding to the combined summary, from the video data and the audio data.

14. The method of claim 1, further comprising:
adding additional video frames before and after the video frames to the combined summary.

15. An apparatus to provide a combined summary of video and audio data, comprising:
a receiver configured to obtain video data and audio data; and
at least one processor to implement:
a video summary generator configured to generate the video summary from the video data, the video summary containing at least one of video events detected by at least one of identifiable video features and audio features;
an audio summary extractor configured to control to search for a video event in the video summary that matches an audio event at least partially based on audio features; and
an audio summary provider configured to control to display an indicator of the audio event with the video event while displaying the video event.

16. The apparatus of claim 15, wherein the audio event is determined to be detected when a human voice is included in a portion of the audio data corresponding to the audio event.

17. The apparatus of claim 16, wherein the video summary generator is further configured, when generating the video summary, to:
find a specific time period in which the audio event occurs;
determine that the video event occurs in around the specific time period;
add the video event to the video summary; and
add information on characteristics of the human voice to the video summary as meta data for the video event.

18. The apparatus of claim 17, wherein the audio features are identified by at least one of characteristics of the human voice, the characteristics including at least one of a sex, an age, a type of dialect and an estimated human race.

19. The apparatus of claim 16, wherein the video summary generator is further configured, when generating the video summary, to:
recognize the human voice in the audio event;
convert the human voice into a text;
find a specific time period in which the audio event occurs if a specified word is determined to be included;
determine that the video event occurs in around the specific time period; and
add the text to the video summary as meta data for the video event.

20. The apparatus of claim 19, wherein at least a part of the text is displayed as the indicator of the audio event with the video event.

21. The apparatus of claim 15, wherein the audio event is determined to be detected when a pattern of specified sound is included in a portion of the audio data corresponding to the audio event, the pattern of specified sound representing one of gunfire, a scream, alarm sound, explosion and breaking sound, and
wherein the video summary generator is further configured, when generating the video summary, to add information on the pattern to the video summary as meta data for the video event.

22. A method for providing a combined summary of video and audio data, the method comprising:
obtaining video data and audio data from at least one camera;
generating a video summary from the video data, the video summary containing at least one of video events detected by at least one of identifiable video features and audio features;
generating an audio summary that matches an audio event at least based on the audio features;
controlling to search for a video event in the video summary that matches the audio event; and
generating the combined summary by combining the video summary and the audio summary.

* * * * *